United States Patent
Jang

(10) Patent No.: US 7,878,520 B2
(45) Date of Patent: Feb. 1, 2011

(54) OVERDRIVE SYSTEM FOR FOUR-WHEEL BICYCLE

(76) Inventor: Ik-Byung Jang, 101-301, Woolim Lumi APT., 1135, Namhyun-Dong,Gwanak-Gu (KR)

( * ) Notice: Subject to any disclaimer, the term of this patent is extended or adjusted under 35 U.S.C. 154(b) by 127 days.

(21) Appl. No.: 12/335,835

(22) Filed: Dec. 16, 2008

(65) Prior Publication Data
US 2009/0283981 A1 Nov. 19, 2009

(30) Foreign Application Priority Data
May 16, 2008 (KR) .................. 10-2008-0045340

(51) Int. Cl.
*B62M 1/00* (2010.01)
(52) U.S. Cl. .................. 280/253; 280/257; 280/252
(58) Field of Classification Search ................ 280/253, 280/257, 210, 221, 252, 87.1, 258
See application file for complete search history.

(56) References Cited

U.S. PATENT DOCUMENTS

| | | | | |
|---|---|---|---|---|
| 833,314 A | * | 10/1906 | Fothergill | ................... 280/257 |
| 1,600,646 A | * | 9/1926 | Stetson | ................... 280/221 |
| 1,798,971 A | * | 3/1931 | Clements | ................... 280/215 |
| 2,607,613 A | * | 8/1952 | Lesaunier | ................... 280/217 |
| 6,079,727 A | * | 6/2000 | Fan | ................... 280/265 |
| 6,241,269 B1 | * | 6/2001 | Fan | ................... 280/265 |
| 6,270,102 B1 | * | 8/2001 | Fan | ................... 280/252 |
| 6,688,624 B2 | * | 2/2004 | Christensen et al. | ........ 280/255 |
| 6,769,706 B2 | * | 8/2004 | Chow | ................... 280/256 |
| 6,857,648 B2 | * | 2/2005 | Mehmet | ................... 280/217 |
| 7,621,547 B1 | * | 11/2009 | Fan | ................... 280/221 |
| 7,686,316 B2 | * | 3/2010 | Pasternak | ................... 280/221 |
| 2007/0120341 A1 | * | 5/2007 | Pasternak | ................... 280/221 |

FOREIGN PATENT DOCUMENTS

KR 10-2006-0006902 12/2006

* cited by examiner

*Primary Examiner*—Lesley Morris
*Assistant Examiner*—Tashiana Adams
(74) *Attorney, Agent, or Firm*—NSIP Law

(57) ABSTRACT

Disclosed is an overdrive system for a bicycle, which increases the speed through use of a combination of a plurality of sprockets and ratchet wheels, and which drives with less power where a user steps on a pedal of a drive lever using the principle of a lever as overdrive generating means.

18 Claims, 6 Drawing Sheets

US 7,878,520 B2

OVERDRIVE SYSTEM FOR FOUR-WHEEL BICYCLE

CROSS-REFERENCE TO RELATED APPLICATION(S)

This application claims the benefit under 35 U.S.C. §119(a) of a Korean Patent Application No. 10-2008-0045340, filed on May 16, 2008 in the Korean Intellectual Property Office, the entire disclosure of which is hereby incorporated by reference.

TECHNICAL FIELD

The following description relates to an overdrive system, and more particularly, to an overdrive system for a four-wheel bicycle which may increase the speed through a combination of a plurality of sprockets and ratchet wheels, and require less power where a user steps on a pedal of a drive lever using the principle of a lever as overdrive generating means.

BACKGROUND

Korean Patent No. 656,811 (Korean Patent Application No. 10-2006-0006902, filed on Jan. 23, 2006) granted to the Applicant of the instant application, from Korean Intellectual Property Office, disclosures of which are hereby incorporated by reference, discloses an "overdrive system of a taxi-type bicycle." FIG. 1 shows an overdrive system of a taxi-type bicycle having a plurality of sprockets and ratchet wheels.

As shown in FIG. 1, in case of the overdrive system, where a user steps on a forward pedal 51 of a forward lever 50, a ratchet wheel 29 joined to an end portion of the forward pedal 51 rotates a shaft 41, a first ratchet wheel 21 connected to the ratchet wheel 29 via a first chain 31 is rotated, and a second large-scale sprocket 12 or a fifth ratchet wheel 25 is also rotated to thereby rotate a rear wheel 92.

However, since a distance ranging from the forward pedal 51 of the forward lever 50 to the ratchet wheel 29 is long, the bicycle having the overdrive system with the above-mentioned structure may not be rapid when the user steps on the forward pedal 51 because a rotational displacement of the ratchet wheel 29 is small.

SUMMARY

Accordingly, according to one general aspect, there is provided an overdrive system for a four-wheel bicycle which may drive at a rapid speed where a user steps on a pedal.

According to another aspect, there is provided an overdrive system for a bicycle, including a drive lever hinge-coupled to a frame at one end portion thereof and having a pedal mounted on the other end portion thereof and a rack downwardly formed at a portion thereof, for example, at a central portion thereof, the drive lever being elastically supported by a spring of the frame, a first wheel being a one-way ratchet wheel joined to a first shaft and gear-coupled with the rack, a first sprocket joined to the first shaft, a second wheel joined to a second shaft and connected with the first sprocket via a chain, a second sprocket joined to the second shaft, a third wheel joined to a third shaft and connected with the second sprocket via a chain, a third sprocket joined to the third shaft, and a fourth wheel joined to a fourth shaft and connected with the third sprocket via a chain.

The overdrive system may further include a backward lever, a driven gear joined to the fourth shaft, and a backward gear joined to a fifth shaft and having a one-way ratchet wheel embedded therein, wherein the backward gear is rotated in a forward direction where a user steps on the backward lever, and the driven gear is rotated in a reverse direction in interlock with the driven gear to thereby drive rear wheels backward, and wherein the backward gear performs no-load operation due to the one-way ratchet wheel embedded therein where the bicycle drives forward.

The rack may be elastically supported by a draft spring mounted at the central point of the drive lever to thereby compress the first wheel.

The first wheel and the fourth wheel may be one-way ratchet wheels.

The pedal may be inserted into an end portion of the drive lever and be elastically supported by a restoring spring, so that the drive lever extends in length where the user pushes a projection of the pedal with the foot on a hill, so as to drive the bicycle with less power.

The bicycle may be a four-wheel bicycle.

According to still another aspect, there is provided an overdrive system for a bicycle, including a drive lever hinge-coupled to a frame at one end portion thereof and the other end portion thereof provided to receive a driving force, the drive lever being elastically supported with respect to the frame, a rack provided at a portion of the drive lever, a first wheel being a one-way ratchet wheel joined to a first shaft and gear-coupled with the rack, a first sprocket joined to the first shaft, a second wheel joined to a second shaft and connected with the first sprocket via a chain, a second sprocket joined to the second shaft, and a third wheel joined to a third shaft and connected with the second sprocket via a chain.

The overdrive system may further comprise a backward lever, a driven gear joined to the third shaft, and a backward gear joined to a shaft and having a one-way ratchet wheel, wherein the backward gear is rotated in a forward direction where a user steps on the backward lever, and the driven gear is rotated in a reverse direction to thereby drive at least one rear wheel backwards.

The rack may be elastically supported at a point of the drive lever to thereby compress the first wheel. The first wheel and the third wheel may be one-way ratchet wheels.

The drive lever may be extendable in length at the other end portion thereof so as to drive the bicycle with less power.

According to yet another aspect, there is provided a bicycle comprising an overdrive system, and one or more drive wheels driven by the overdrive system, wherein the overdrive system comprises a drive lever hinge-coupled to a frame of the bicycle at one end portion thereof and the other end portion thereof provided to receive a driving force, the drive lever being elastically supported with respect to the frame, a rack provided at a portion of the drive lever, a first wheel being a one-way ratchet wheel joined to a first shaft and gear-coupled with the rack, a first sprocket joined to the first shaft, a second wheel joined to a second shaft and connected with the first sprocket via a chain, a second sprocket joined to the second shaft, and a third wheel joined to a third shaft and connected with the second sprocket via a chain.

The one or more drive wheels may be rotated by rotation of the third wheel of the overdrive system.

The overdrive system may further comprise a third sprocket joined to the third shaft and a fourth wheel joined to a fourth shaft and connected with the third sprocket via a chain, and the one or more drive wheels are rotated by rotation of the fourth wheel of the overdrive system.

The overdrive system may further comprise a backward lever, a driven gear joined to the third shaft, and a backward gear joined to a shaft and having a one-way ratchet wheel, wherein the backward gear is rotated in a forward direction where a user steps on the backward lever, and the driven gear is rotated in a reverse direction to thereby drive the one or more drive wheels backward.

The rack may be elastically supported at a point of the drive lever to thereby compress the first wheel. The drive lever may be extendable in length at the other end portion thereof so as to drive the bicycle with less power. The bicycle may be a four-wheel bicycle.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
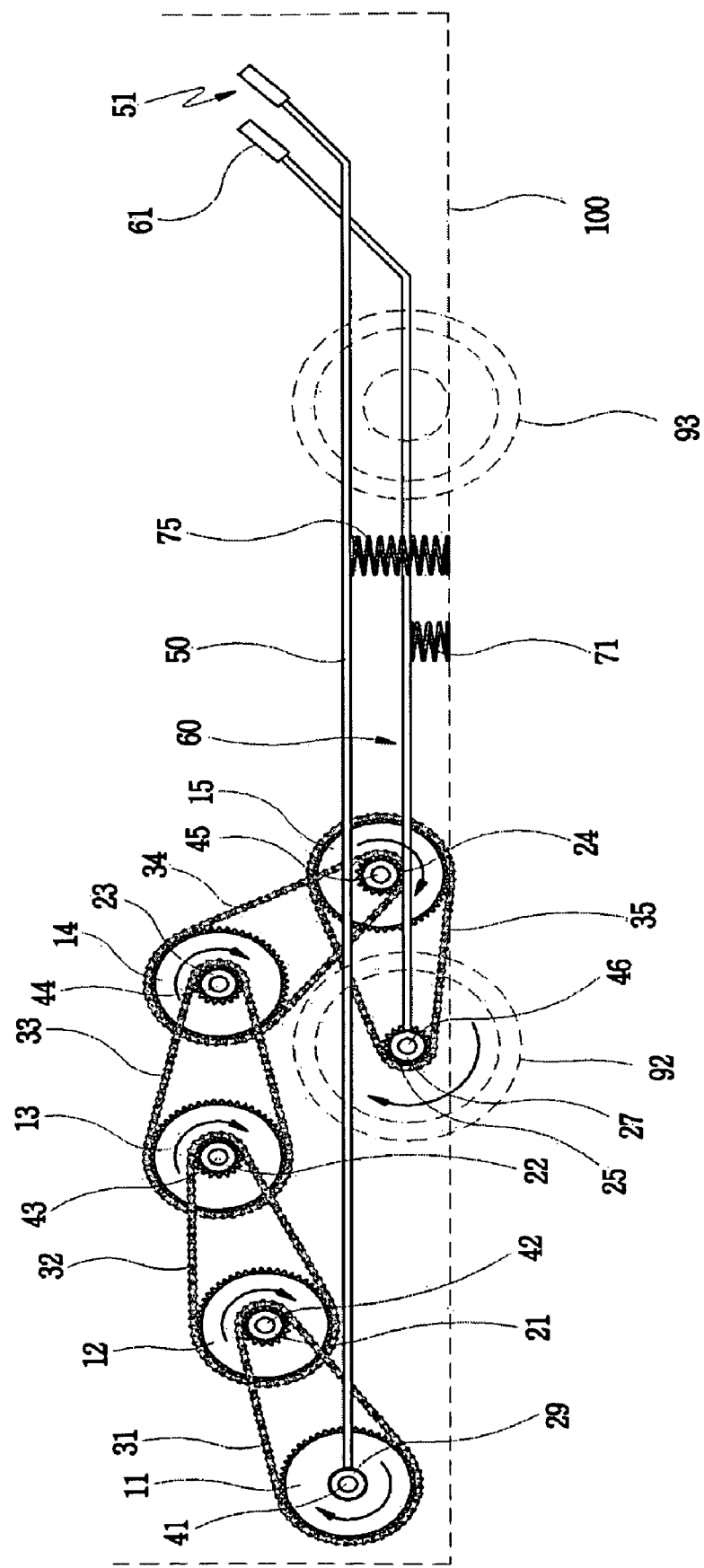
FIG. 1 is a configurative view of an overdrive system for a bicycle.
Figure 2:
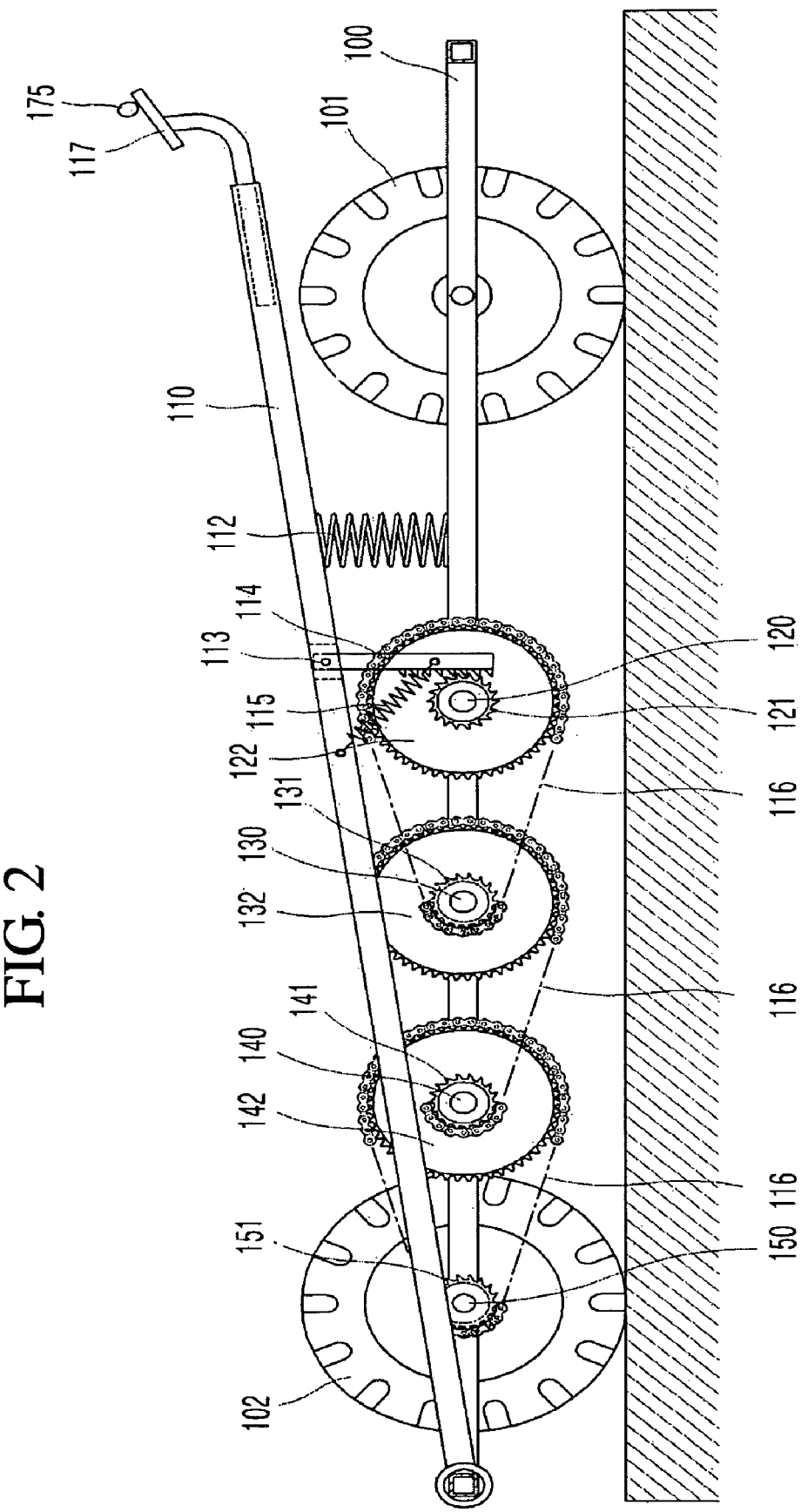
FIG. 2 is a side elevation view of an overdrive system for a bicycle, for example, a four-wheel bicycle, according to an exemplary embodiment.
Figure 3:
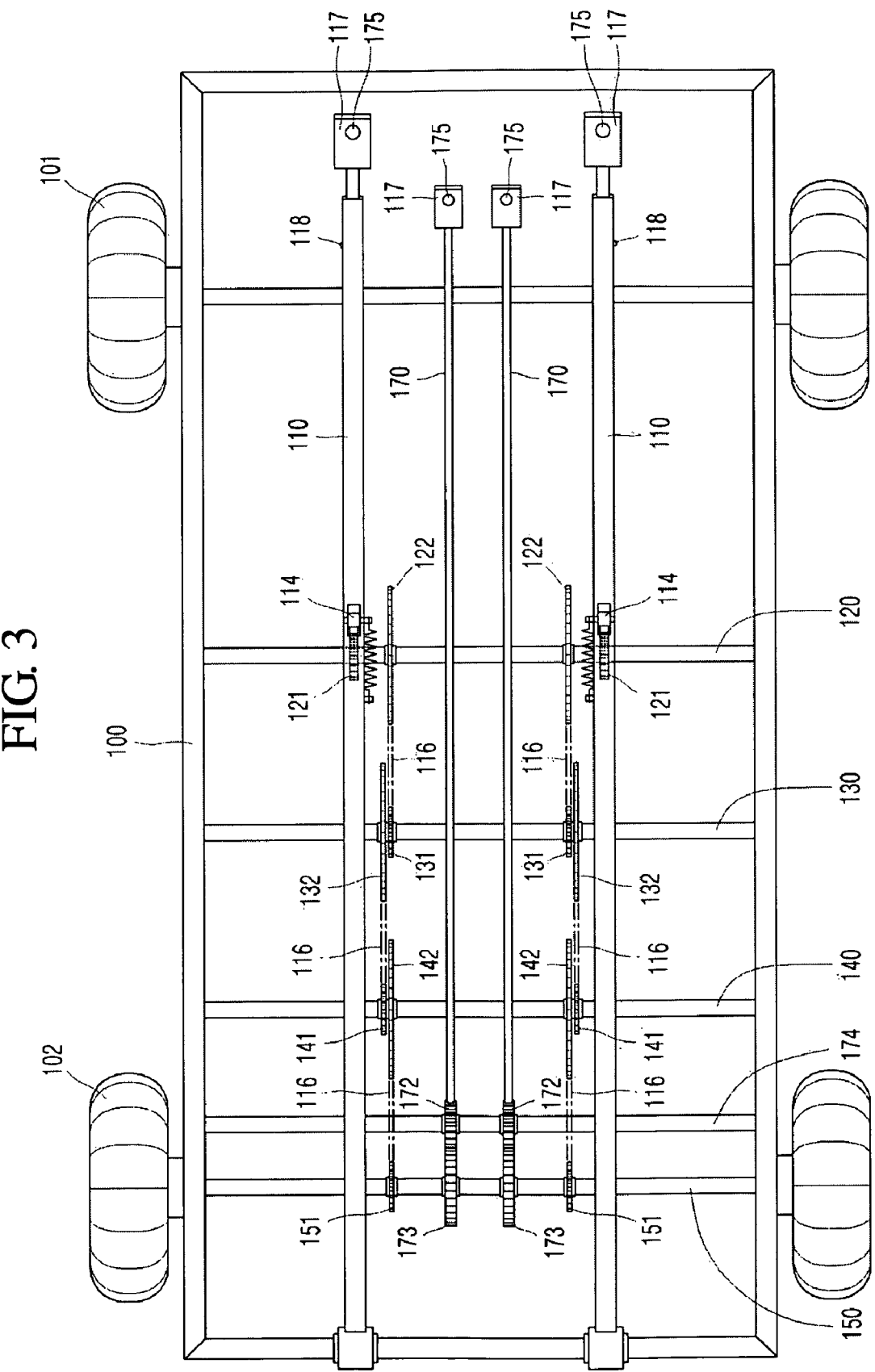
FIG. 3 is a plan view of an overdrive system for a four-wheel bicycle according to an exemplary embodiment.
Figure 4:
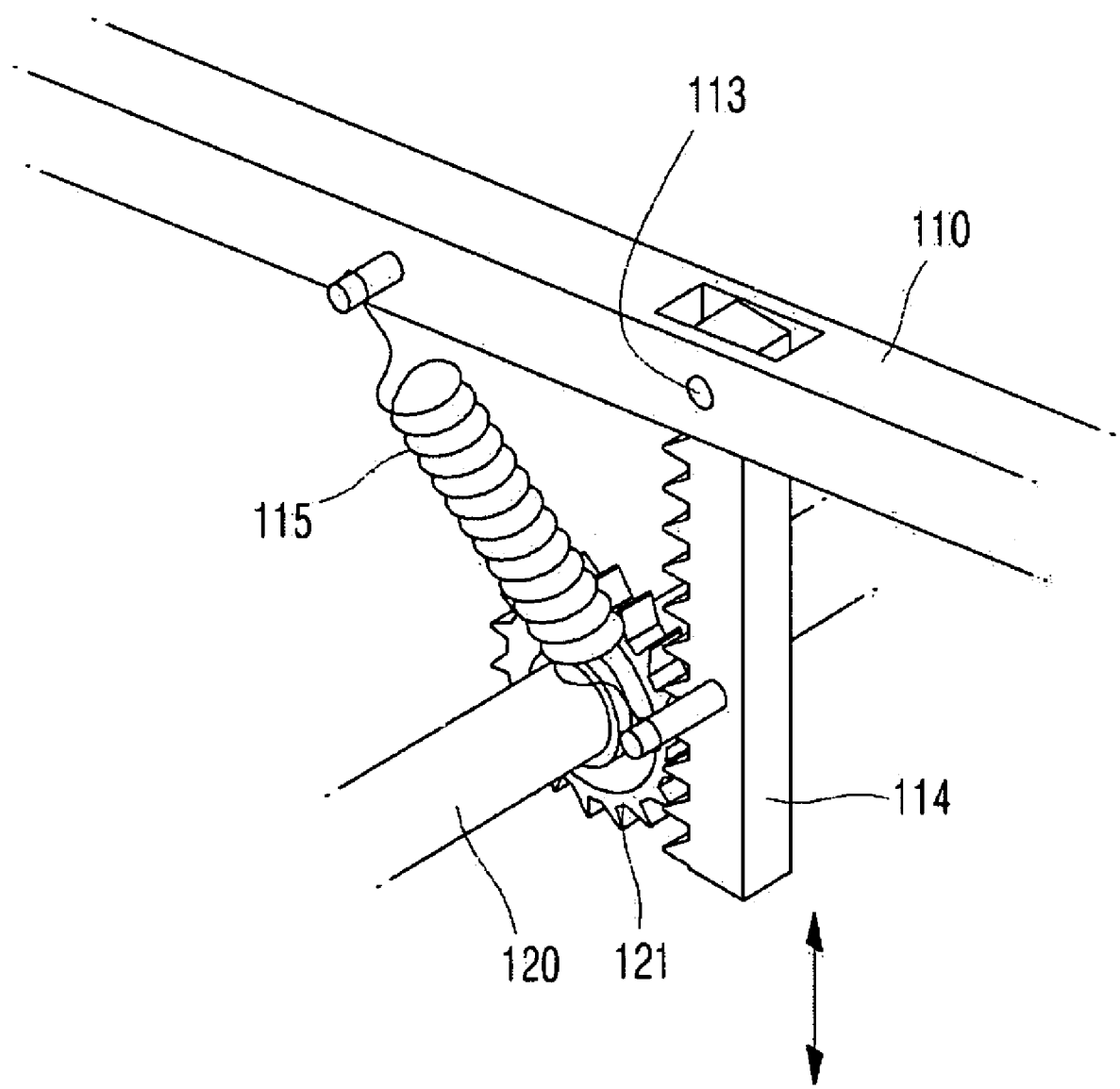
FIG. 4 is a perspective view showing a combined state of a rack of a drive lever and a first wheel according to an exemplary embodiment.
Figure 5:
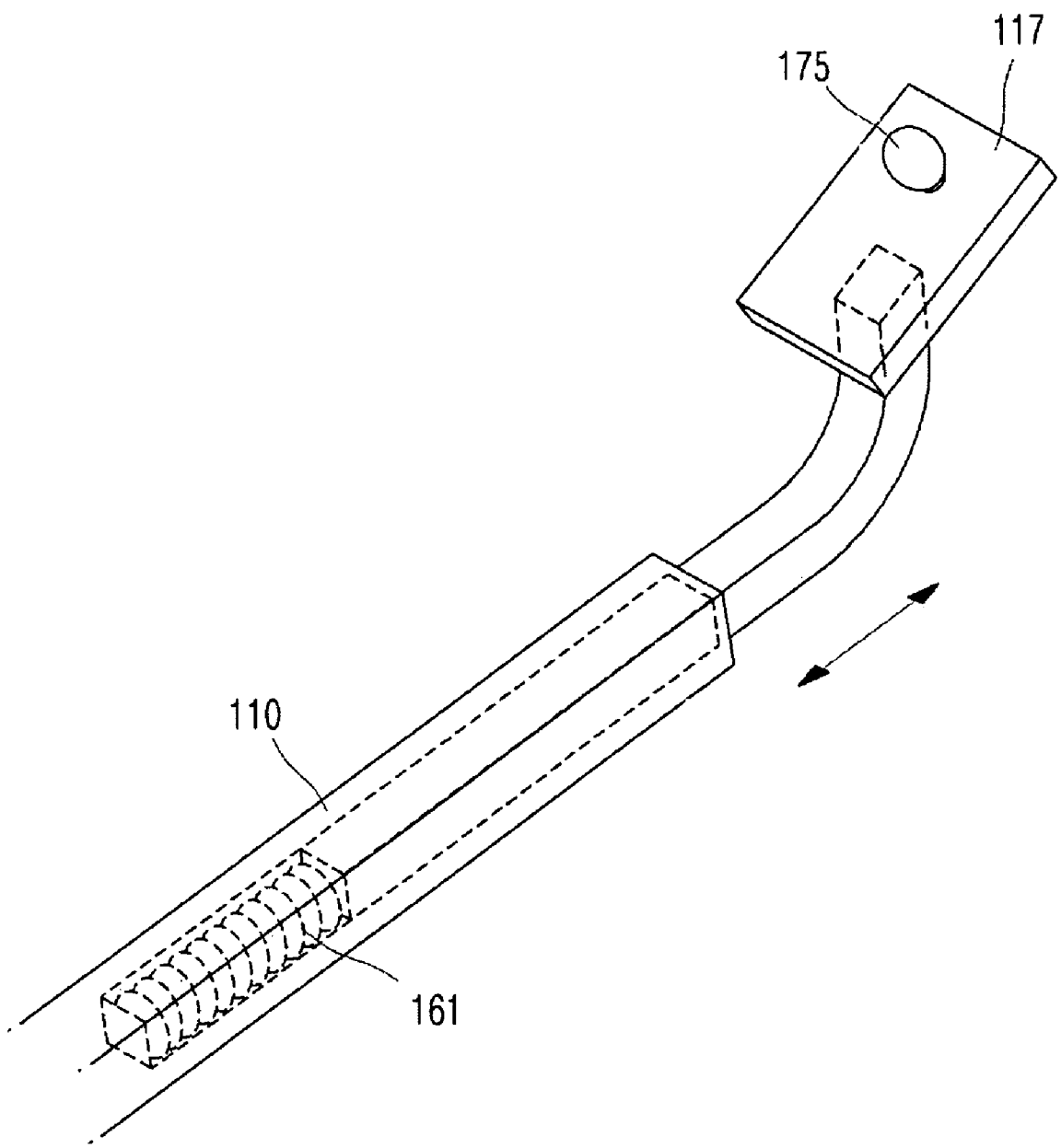
FIG. 5 is a perspective view showing a combined state of a drive lever and a pedal according to an exemplary embodiment.
Figure 6:
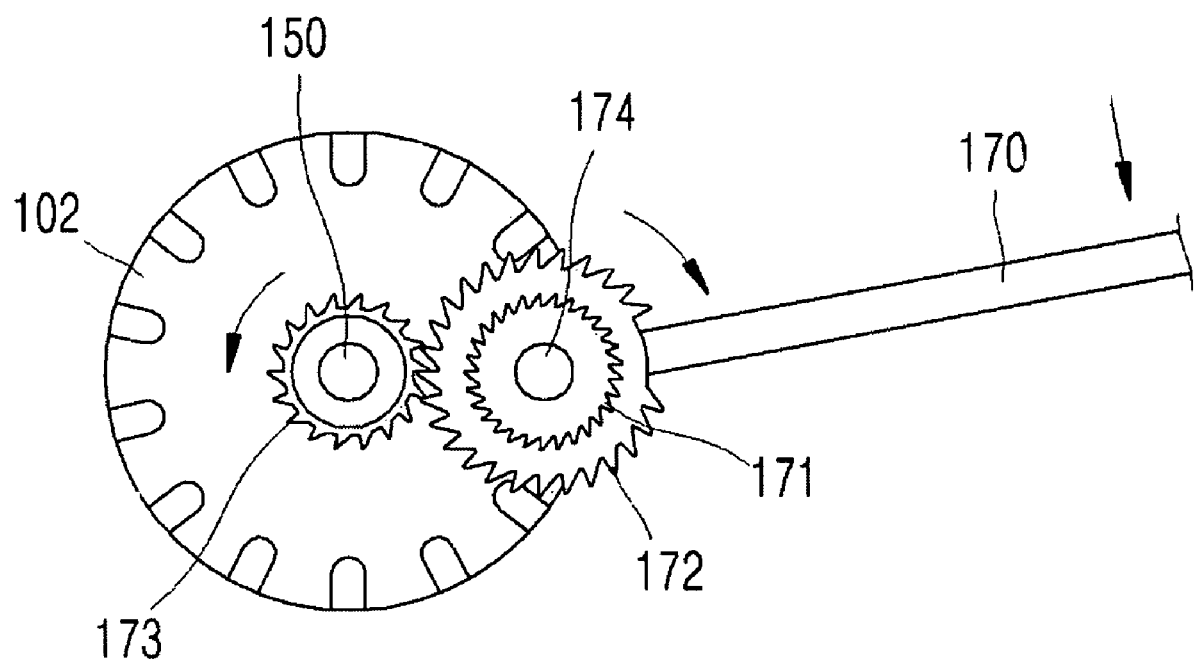
FIG. 6 is a configurative view showing a combined state of a backward lever and rear wheels according to an exemplary embodiment.

FIG. 2 shows a side elevation view of an overdrive system for a bicycle, for example, a four-wheel bicycle according to an exemplary embodiment. FIG. 3 shows a plan view of the overdrive system for the four-wheel bicycle according to an exemplary embodiment. FIG. 4 shows a perspective view of a combined state of a rack of a drive lever and a first wheel, FIG. 5 shows a perspective view of a combined state of the drive lever and a pedal, and FIG. 6 shows a configurative view of a combined state of a backward lever and rear wheels.

As shown in FIGS. 2 and 3, an overdrive system comprises a frame 100 having a plurality of shafts, a plurality of wheels and sprockets joined to the shafts, and a drive lever 110 to drive the wheels and the sprockets.

A first wheel 121 and a first sprocket 122 are formed on a first shaft 120, a second wheel 131, which is connected with the first sprocket 122 via a chain 116, and a second sprocket 132 are formed on a second shaft 130 of the frame 100, a third wheel 141, which is connected with the second sprocket 132 via a chain 116, and a third sprocket 142 are formed on a third shaft 140 of the frame 100, a fourth wheel 151, which is connected with the third sprocket 142 via a chain 116, is formed on a fourth shaft 150 of the frame 100, and rear wheels 102 are formed on both end portions of the fourth shaft 150.

Furthermore, the drive lever 110 is hinge-coupled with the frame 100, includes a pedal 117 formed on an end portion thereof, and is elastically supported by a spring 112 of the frame 100. The drive lever 110 is constructed in such a way that a rack 114 having a gear formed on one side thereof is hinge-coupled with the drive lever 110 and gear-coupled with a gear formed on an outer circumference of the first wheel 121.

In this instance, as shown in FIG. 4, the rack 114 is compressed to the first wheel 121 by elasticity of a draft spring 115 of the drive lever 110, whereby a driving power is transferred smoothly. Moreover, the first wheel 121 is a ratchet wheel to transfer the driving power to the first shaft 120 only when it rotates in one direction.

Hereinafter, an operation of the overdrive system for the four-wheel bicycle according to an exemplary embodiment will be described.

Where a user steps on the pedal 117 of the drive lever 110, while the drive lever 110 lowers, the rack 114, which is hinge-coupled with the drive lever 110 and has the gear formed on one side thereof, lowers and rotates the first wheel 121, and hence, the first wheel 121 rotates the first shaft 120 to rotate the first sprocket 122.

In this instance, after the drive lever 110 lowers and rotates the first wheel 121, the drive lever 110 rises again by elasticity of the spring 112 of the frame 100, and in this instance, the rack 114 also rises to thereby rotate the first wheel 121 in a reverse direction, but does not rotate the first shaft 120 in the reverse direction since the first wheel 121 is, for example, the one-way ratchet wheel.

As described above, since the first sprocket 122 is connected with the second wheel 131 of the second shaft 130 via the chain 116 by aid of the first wheel 121, the second wheel 131 is rotated, and the second sprocket 132 is also rotated by rotation of the second shaft 130 of the second wheel 131. In addition, since the second sprocket 132 is connected with the third wheel 141 of the third shaft 140 via the chain 116, the third wheel 141 is rotated, and the third sprocket 142 is also rotated by rotation of the third shaft 140 of the third wheel 141. Furthermore, since the third sprocket 142 is connected with the fourth wheel 151 of the fourth shaft 150 via the chain 116, the fourth wheel 151 is rotated, and the rear wheels 102 joined to both ends of the fourth shaft 150 are also rotated by rotation of the fourth shaft 150 of the fourth wheel 151, whereby the bicycle drives.

According to an aspect, since gears formed on outer circumferences of the wheels and the sprockets formed on the first to fourth shafts 120, 130, 140 and 150 are formed in the ratio of, for example, 1:3, where the first sprocket 122 of the first shaft 120 is rotated once, the second sprocket 132 of the second shaft 130 is rotated three times, and hence, the fourth shaft 150 is rotated twenty seven times where the first sprocket 122 is rotated once, whereby the overdrive of the bicycle may be achieved.

It is understood that not only the first wheel 121 but also the second, third and fourth wheels 131, 141 and 151 may be respectively constructed of one-way ratchet wheels.

Furthermore, the drive lever 110 may be joined not only to the frame 100 but also to one of the shafts 120, 130, 140 and 150.

Greater driving power may be needed where the four-wheel bicycle goes up a hill. In this instance, where the user steps on the pedal 117 after pushing a projection 175 of the pedal 117 inserted into the end portion of the drive lever 110 with the foot to slidably move the pedal 117 away from the drive lever 110, the user's stepping power on the pedal 117 is increased more due to the principle of the lever to thereby rotate the first wheel 121. Accordingly, the bicycle may go up the hill more easily.

As shown in FIG. 5, since the pedal 117 of the drive lever 110 is inserted on one end portion of the drive lever 110, which has a restoring spring 161 mounted therein, the pedal 117 is restored to the original position where the user releases the pedal after the bicycle completely goes up the hill.

Moreover, as shown in FIG. 5, since the projection 175 of a thumb size is formed on the surface of the pedal 117, the projection 175 provides an acupressure effect to the user's foot when the user steps on the pedal 117.

Additionally, as shown in FIGS. 3 and 6, the overdrive system may further comprise a structure for backwardly driving the bicycle.

As shown in FIG. 6, the overdrive system comprises a backward lever 170 having a pedal (not shown) formed on one end portion thereof, and the other end portion is joined to a backward gear 172 of a fifth shaft 174. The backward gear 172 is formed on the fifth shaft 174, to which the backward lever 170 is joined, and has a ratchet wheel 171 embedded therein to transfer the driving power in one direction.

A driven gear 173 is gear-coupled to the backward gear 172 and rotated in interlock with the backward gear 172.

Where the user steps on the pedal of the backward lever 170, the backward lever 170 rotates the fifth shaft 174 in the clockwise direction, the backward gear 172 joined to the fifth shaft 174 is rotated in the clockwise direction, and the driven gear 173 gear-coupled with the backward gear 172 is rotated in the counter clockwise direction, so that the rear wheels 102 are rotated to drive the bicycle backward.

In this case, while not shown in the drawings, a spring (not shown) may be mounted between the backward lever 170 and the frame 100, so that the pedal rises again by elasticity of the spring after the user steps on the pedal.

As described above, while the fifth shaft 174 joined to the backward lever 170 is rotated in the reverse direction, namely, in the counter clockwise direction, where the pedal rises, the backward gear 172 of the fifth shaft 174 performs a no-load operation since it has the ratchet wheel, which transfers the driving power only in one direction.

An overdrive system according to certain embodiments disclosed above may allow a bicycle having the same, load heavy goods thereon, accommodate several people thereon, and/or allows the user to rapidly drive the bicycle with less power or effort through a combination of a plurality of sprockets and wheels using the principle of a lever.

It is understood that while a four-wheel bicycle has been described, this is only exemplary, and that an overdrive system consistent with the instant teachings may be provided for a bicycle having less or more than four wheels. For example, an overdrive system may be provided for a three-wheel bicycle or five-wheel bicycle. Similarly, while first through fourth wheels were described with respect to an exemplary overdrive system, it is understood that less or more than 4 wheels (and less or more than corresponding three sprockets) may be used.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An overdrive system for a bicycle, comprising:
   a drive lever hinge-coupled to a frame at one end portion thereof and having a pedal mounted on the other end portion thereof and a rack downwardly formed at a portion thereof, the drive lever being elastically supported by a spring of the frame;
   a first wheel being a one-way ratchet wheel joined to a first shaft and gear-coupled with the rack;
   a first sprocket joined to the first shaft;
   a second wheel joined to a second shaft and connected with the first sprocket via a chain;
   a second sprocket joined to the second shaft;
   a third wheel joined to a third shaft and connected with the second sprocket via a chain;
   a third sprocket joined to the third shaft; and
   a fourth wheel joined to a fourth shaft and connected with the third sprocket via a chain.

2. The overdrive system according to claim 1, further comprising:
   a backward lever;
   a driven gear joined to the fourth shaft; and
   a backward gear joined to a fifth shaft and having a one-way ratchet wheel embedded therein,
   wherein the backward gear is rotated in a forward direction where a user steps on the backward lever, and the driven gear is rotated in a reverse direction to thereby drive rear wheels backward, and wherein the backward gear performs no-load operation due to the one-way ratchet wheel embedded therein where the bicycle drives forward.

3. The overdrive system according to claim 2, wherein the rack is elastically supported by a draft spring mounted at a point of the drive lever to thereby compress the first wheel.

4. The overdrive system according to claim 2, wherein the first wheel and the fourth wheel are one-way ratchet wheels.

5. The overdrive system according to claim 1, wherein the pedal is inserted into an end portion of the drive lever and elastically supported by a restoring spring, so that the drive lever extends in length where a user pushes a projection of the pedal, so as to drive the bicycle with less power.

6. The overdrive system according to claim 1, wherein the rack is elastically supported by a draft spring mounted at a point of the drive lever to thereby compress the first wheel.

7. The overdrive system according to claim 1, wherein the first wheel and the fourth wheel are one-way ratchet wheels.

8. The overdrive system according to claim 1, wherein the bicycle is a four-wheel bicycle.

9. An overdrive system for a bicycle, comprising:
   a drive lever hinge-coupled to a frame at one end portion thereof and the other end portion thereof provided to receive a driving force, the drive lever being elastically supported with respect to the frame;
   a rack provided at a portion of the drive lever;
   a first wheel being a one-way ratchet wheel joined to a first shaft and gear-coupled with the rack;
   a first sprocket joined to the first shaft;
   a second wheel joined to a second shaft and connected with the first sprocket via a chain;
   a second sprocket joined to the second shaft;
   a third wheel joined to a third shaft and connected with the second sprocket via a chain;
   a backward lever;
   a driven gear joined to the third shaft; and a backward gear joined to a shaft and having a one-way ratchet wheel, wherein the backward gear is rotated in a forward direction where a user steps on the backward lever, and the driven gear is rotated in a reverse direction to thereby drive at least one rear wheel backwards.

10. The overdrive system according to claim 9, wherein the rack is elastically supported at a point of the drive lever to thereby compress the first wheel.

11. The overdrive system according to claim 9, wherein the first wheel and the third wheel are one-way ratchet wheels.

12. The overdrive system according to claim 9, wherein the drive lever is extendable in length at the other end portion thereof so as to drive the bicycle with less power.

13. A bicycle comprising:

an overdrive system; and one or more drive wheels driven by the overdrive system, wherein the overdrive system comprises:

a drive lever hinge-coupled to a frame of the bicycle at one end portion thereof and the other end portion thereof provided to receive a driving force, the drive lever being elastically supported with respect to the frame;

a rack provided at a portion of the drive lever;

a first wheel being a one-way ratchet wheel joined to a first shaft and gear-coupled with the rack;

a first sprocket joined to the first shaft;

a second wheel joined to a second shaft and connected with the first sprocket via a chain;

a second sprocket joined to the second shaft;

a third wheel joined to a third shaft and connected with the second sprocket via a chain;

a backward lever;

a driven gear joined to the third shaft; and a backward gear joined to a shaft and having a one-way ratchet wheel, wherein the backward near is rotated in a forward direction where a user steps on the backward lever, and the driven gear is rotated in a reverse direction to thereby drive the one or more drive wheels backward.

14. The bicycle according to claim 13, wherein the one or more drive wheels are rotated by rotation of the third wheel of the overdrive system.

15. The bicycle according to claim 13, wherein:

the overdrive system further comprises a third sprocket joined to the third shaft and a fourth wheel joined to a fourth shaft and connected with the third sprocket via a chain, and the one or more drive wheels are rotated by rotation of the fourth wheel of the overdrive system.

16. The bicycle according to claim 13, wherein the rack is elastically supported at a point of the drive lever to thereby compress the first wheel.

17. The bicycle according to claim 13, wherein the drive lever is extendable in length at the other end portion thereof so as to drive the bicycle with less power.

18. The bicycle according to claim 13, wherein the bicycle is a four-wheel bicycle.

* * * * *